(12) United States Patent
Salas et al.

(10) Patent No.: US 6,328,548 B1
(45) Date of Patent: Dec. 11, 2001

(54) SYSTEM FOR CAPTURING STRETCHED FABRICS IN CARRIER FRAMES

(75) Inventors: Carol A. Salas, Mokena, IL (US); David Korhorn, Rockford; Roger W. Shores, Jr., Grand Rapids, both of MI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/659,528

(22) Filed: Sep. 12, 2000

Related U.S. Application Data

(62) Division of application No. 09/229,145, filed on Jan. 12, 1999.

(51) Int. Cl.[7] .............................. B29C 33/12; B29C 45/14
(52) U.S. Cl. ..................... 425/111; 264/252; 425/122; 425/292
(58) Field of Search ..................... 425/111, 122, 425/292; 264/252

(56) References Cited

U.S. PATENT DOCUMENTS

| | | | |
|---|---|---|---|
| 2,811,744 | * | 11/1957 | Baldanza . |
| 3,424,837 | * | 1/1969 | Martin . |
| 4,269,579 | * | 5/1981 | Thomas ................................ 425/111 |
| 4,480,742 | * | 11/1984 | Muylle ................................ 198/689 |
| 4,728,477 | * | 3/1988 | Dromigny ............................ 425/122 |
| 4,743,323 | * | 5/1988 | Hettinga .............................. 156/160 |
| 5,093,067 | * | 3/1992 | Gibson ................................ 425/116 |
| 5,393,474 | * | 2/1995 | Souders ............................... 425/292 |
| 5,527,500 | * | 6/1996 | Specht ................................ 264/252 |
| 6,033,613 | * | 3/2000 | Heyn et al. .......................... 264/252 |

FOREIGN PATENT DOCUMENTS

| | | | |
|---|---|---|---|
| 2031326-A | * | 4/1980 | (GB) . |
| 60-220718-A | * | 11/1985 | (JP) ..................................... 425/122 |

* cited by examiner

*Primary Examiner*—Robert Davis
(74) *Attorney, Agent, or Firm*—Paul F. Donovan

(57) ABSTRACT

A method and system for capturing support materials in carrier frames in the manufacture of seat components for chairs including moving the support material to an openable mold press forming a mold cavity for the carrier frame when the mold press is closed, shaping the support material, and molding the carrier frame to capture the shaped material in the carrier frame. In one embodiment, the support material is stretched as it is moved to the mold press, and/or in the mold press before molding the carrier frame. Excess support material is removable from an outer side portion of the carrier frame after molding the carrier frame and before discharging the carrier frame and support material captured thereby from the mold press.

22 Claims, 6 Drawing Sheets

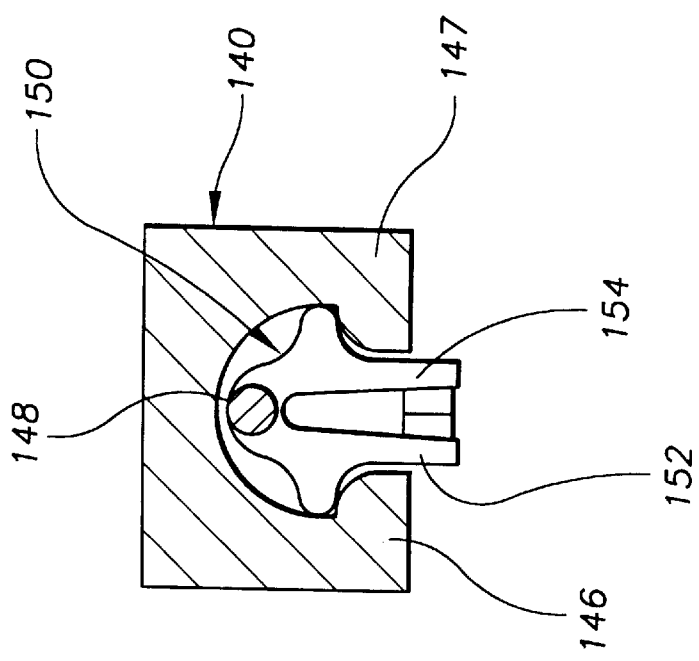
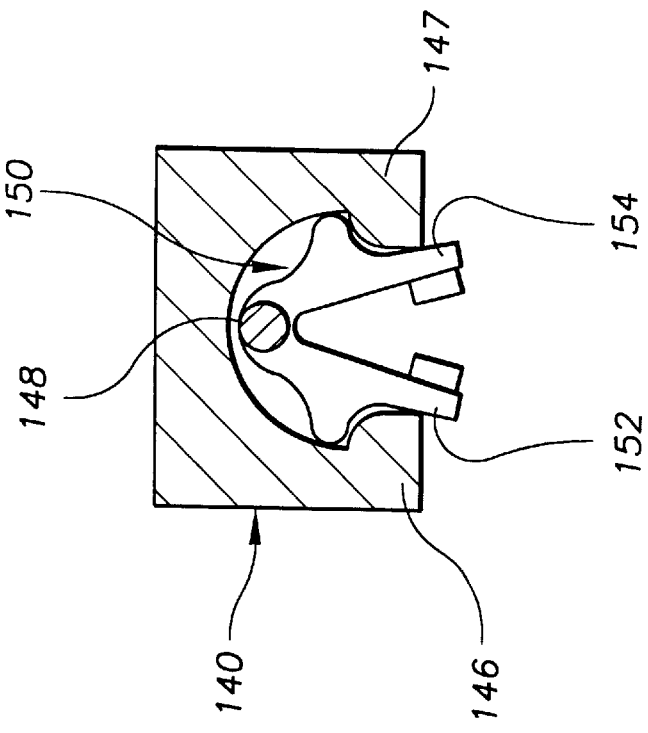
FIG. 4a
FIG. 4b

SYSTEM FOR CAPTURING STRETCHED FABRICS IN CARRIER FRAMES

CROSS REFERENCE TO RELATED APPLICATIONS

The present application is a divisional application of co-pending U.S. application Ser. No. 09/229,145, "Method For Capturing Stretched Fabrics In Carrier Frames", filed on Jan. 12, 1999, which is assigned commonly with the present application.

BACKGROUND OF THE INVENTION

The invention relates generally to capturing support materials in carrier frames, and more particularly to insert molding support materials in carrier frames, useable in the manufacture of seat and seat back components.

Many manufacturing operations include the molding of a support material in a rigid or non-rigid frame. In the manufacture of seat and seat back components, for example, a stretched elastic material, or fabric, is insert molded in a non-rigid plastic carrier frame. The non-rigid carrier frame and stretched fabric captured thereby is then mounted in a recess of a relatively rigid seat or seat back member of a chair, thereby providing very comfortable seat and back support.

Known prior art systems and methods for insert molding stretched elastic fabrics in plastic carrier frames are performed by complex machinery, and also require substantial participation by a human operator. The productivity of these known operations is costly and limited by the relatively poor machinery reliability and high maintenance requirements, and by operator inefficiency and inconsistencies.

In the known prior art process flow diagram of FIG. 6, a pre-cut stretchable elastic fabric blank is placed manually in a fabric stretcher, illustrated in block 1, which is actuatable pneumatically or by other automated means to stretch the fabric, usually in two dimensions. As with any prolonged activity, however, repetitive placement of the fabric blanks in the fabric stretcher and the handling thereof generally without resting periodically may subject the operator to mental and physical fatigue, which adversely affects productivity. Also, production usually ceases during operator rest periods unless an alternate operator is available to resume production.

In the prior art process flow diagram of FIG. 6, the stretched fabric is locked in a loom, illustrated in block 2, between mating frame-like members, which are manually clamped together from opposing sides of the fabric blank, before the stretched fabric is released from the fabric stretcher, illustrated in block 3. The locked loom and the stretched fabric retained thereby are then transported along a conveyor to a mold press, illustrated in block 4, where the loom is aligned and retained for the molding operation. More particularly, the mold press closes on the loom and the stretched fabric before the carrier frame is molded from a plastic or other known material suitable for use in molding operations so that the stretched fabric is captured and retained by the molded carrier frame, as illustrated in block 5.

One known stretchable elastic material suitable for the manufacture of seats and seat back components includes woven fibers, for example LYCRA fibers. The weave of some fabric materials however has a visible weave pattern, and thus it is desirable aesthetically that the weave pattern be aligned properly in the assembled chair. It is important therefore that the fabric blank be aligned accurately when placed initially in the fabric stretcher and that the loom be aligned accurately thereabout, since a misaligned weave pattern will render the molded carrier frame unacceptable for use in the final chair assembly. To facilitate the alignment procedure and to reduce waste, it is necessary to provide a fabric alignment apparatus. The alignment apparatus however is costly and does not ensure accurate alignment, which depends ultimately on the skill and attentiveness of the operator.

In FIG. 6, after the molding operation, the locked loom retaining the stretched fabric and the molded carrier frame are returned along the conveyor back toward the fabric stretcher, illustrated in block 6, where the loom is unlocked manually to release the molded carrier frame and the stretched fabric portion captured thereby, as illustrated in block 7. The handling of the loom is performed manually, which slows productivity. Also, the operator often stands idle during the molding operation and while the loom is transported to and returned from the mold press, since additional looms may not be conveyed to the mold press along the conveyor until the previously conveyed loom is returned therefrom. This prior art production arrangement is inefficient for its limited throughput, and for its dependency on substantial participation by the operator.

In FIG. 6, after a sufficient cool down period and upon removal of the carrier frame from the loom, excess bulk fabric is removed partially from around the carrier frame by the operator in a rough cutting operation performed manually with automated shears or a heated knife, as illustrated in block 8. The performance of the rough cutting operation however is complicated by the tendency of the non-rigid carrier frame to collapse and twist under the tension of the constricting elastic fabric upon removal thereof from the loom. After the rough cutting operation, the carrier frame is placed manually in an automated trimming machine that removes excess fabric and any mold flash from the outer perimeter, or outer edge portion, of the carrier frame, as illustrated in block 9.

It is important that the carrier frame be trimmed completely and precisely, particularly the inner and outer edge portions thereof, since the carrier frame and the stretched fabric captured thereby are largely visible in the finished article. And although the automated trimming operation is relatively precise, the trimmed carrier frame is subsequently subject to a manual trimming operation, illustrated in block 10, to remove any mold flash from the inner edge portion of the carrier frame and to manually spot trim outer edge portions thereof not trimmed completely in the automated trimming operation. The rough cutting and multiple trimming operations are time consuming and extremely laborious, thus imposing substantial limitations on production and increasing costs. Additionally, any improper cutting or trimming will render the carrier frame unacceptable for use in the final assembly, and is ultimately wasteful since the carrier frame and captured support material are not recyclable.

The present invention is drawn toward advancements in the art of capturing support materials in carrier frames, useable for example in the manufacture of seat and seat back components and for many other applications.

It is an object of the present invention to provide novel methods and systems for capturing support materials, including stretchable elastic fabrics and plastics, in carrier frames that are economical and that overcome one or more problems in the art.

It is another object of the invention to provide novel methods and systems for capturing support materials in carrier frames having generally one or more advantages over the prior art, including improved productivity, reduced dependency on high maintenance and unreliable machinery, reduced dependency on manual operations, eliminating manually handling looms, improved weave pattern alignment accuracy, improved production throughput, and elimination of one or more cutting and/or trimming operations.

It is another object of the invention to provide novel methods and systems for capturing support materials in carrier frames that substantially reduce manually handling of the support material, including reducing Or eliminating repetitive manual placement of the support material on a conveyor, and in some applications placement of the support material in a support material stretcher.

It is a more particular object of the invention to provide novel methods and systems for capturing support materials in carrier frames, useable in the manufacture of seat and seat back components, comprising generally moving the support material, either continuously or as discrete elements, to an openable mold press, the mold press forming a mold cavity for the carrier frame when the mold press is closed, shaping the support material, and molding the carrier frame after shaping the support material to capture the shaped support material in the carrier frame.

It is another more particular object of the invention to provide novel methods and systems for capturing shaped support materials in carrier frames further comprising generally shaping the support material as the support material is moved to the mold press, and/or shaping the support material in the mold press.

It is yet another more particular object of the invention to provide novel methods and systems for capturing support materials in carrier frames further comprising generally at least partially removing excess support material from an outer side portion of the carrier frame after molding the carrier frame, and in one embodiment before discharging the carrier frame and support material captured thereby from the mold press.

These and other objects, aspects, features and advantages of the present invention will become more fully apparent upon careful consideration of the following Detailed Description of the Invention and the accompanying Drawings, which may be disproportionate for ease of understanding, wherein like structure and steps are referenced generally by corresponding numerals and indicators.

BRIEF DESCRIPTION OF THE DRAWINGS

FIG. 4a is a partial sectional view along lines a—a of FIG. 2.

FIG. 4b is a partial sectional view along lines b—b of FIG. 2.

DETAILED DESCRIPTION OF THE INVENTION

Figure 1:
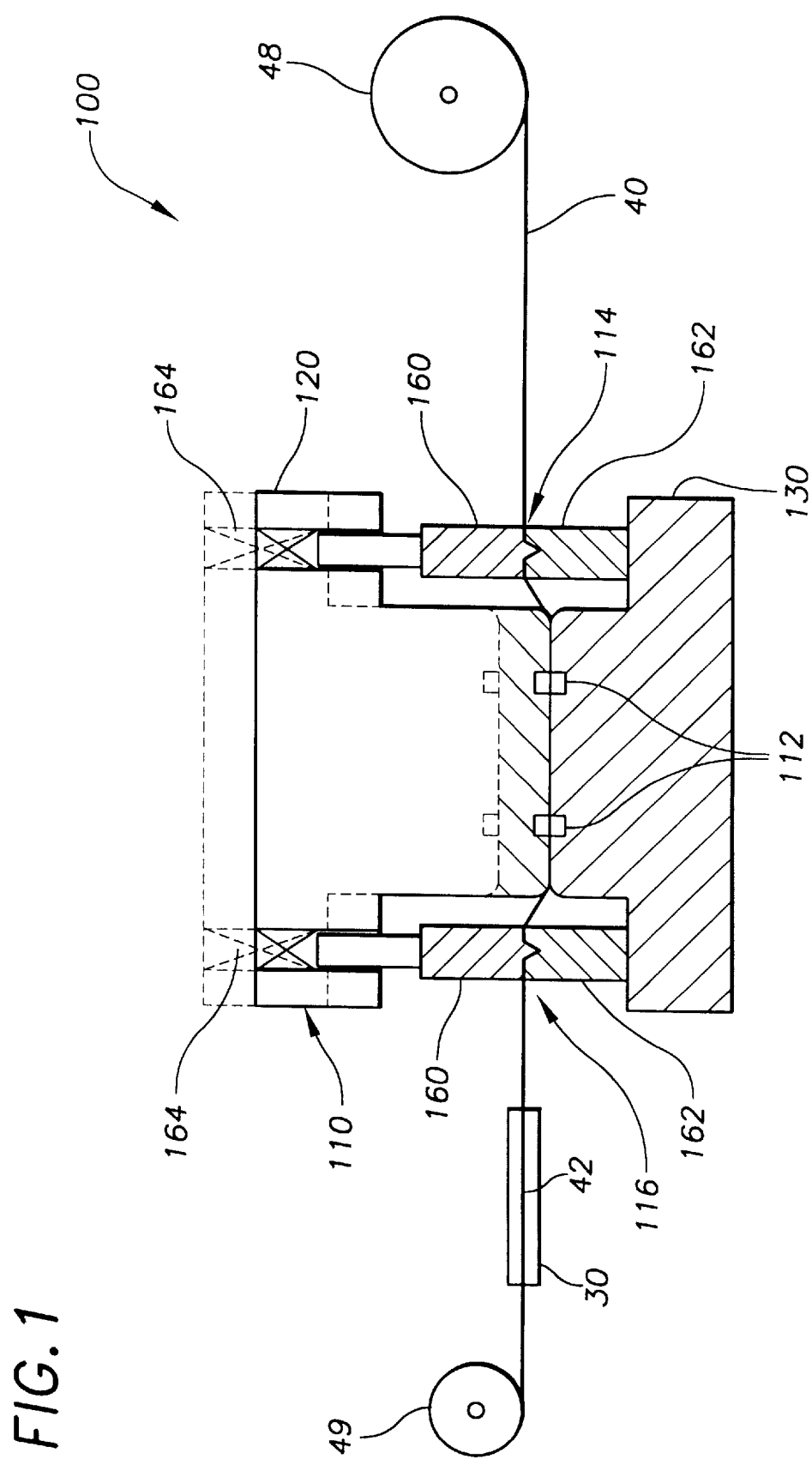
FIG. 1 is a partial sectional top view of an exemplary system for capturing support materials in carrier frames, and useable in the manufacture of seat and seat back components and other articles.
Figure 2:
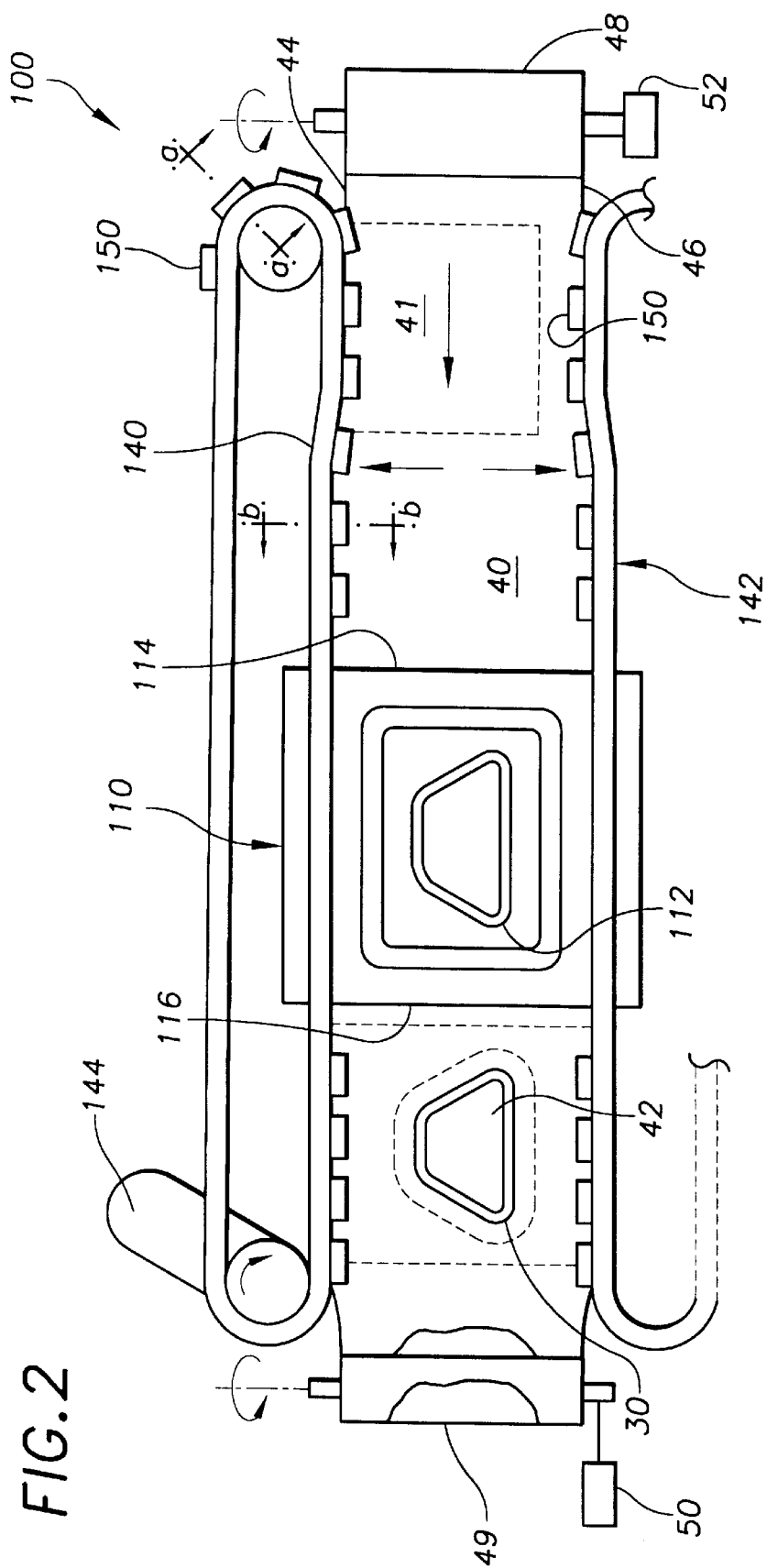
FIG. 2 is a partial side view of an exemplary system of the invention.

FIGS. 1 and 2 are partial top and side views respectively of an exemplary system 100 useable generally for capturing a support material in a carrier frame. The carrier frame as defined herein includes a rigid or non-rigid carrier frame disposable in or assembled with a seat or seat back frame as is known generally in the manufacture of some office chairs. More generally, the carrier frame is a rigid seat or seat back frame itself wherein the support material is captured directly thereby without the requirement for the separate rigid or non-rigid carrier frame sub-assembly. Still more generally, the carrier frame may be any moldable article which captures a support material for applications besides the exemplary seat support applications.

In one exemplary application, the support material is a stretchable fabric that is stretched and captured in a molded carrier frame useable in the manufacture of seat and seat back components for office chairs. More generally, however, the support material may be any material capturable in molded carrier frames, including rigid and non-rigid materials, plastic materials, some metal materials, composite materials, and woven and non-woven materials. Other applications include the manufacture of seat and seat back components for outdoor and children furnishings, office furnishings besides chairs, suspension seats in tractors and other vehicles, and more generally for any application that requires capturing some member in a molded carrier frame of the same or differing materials.

Figure 3:
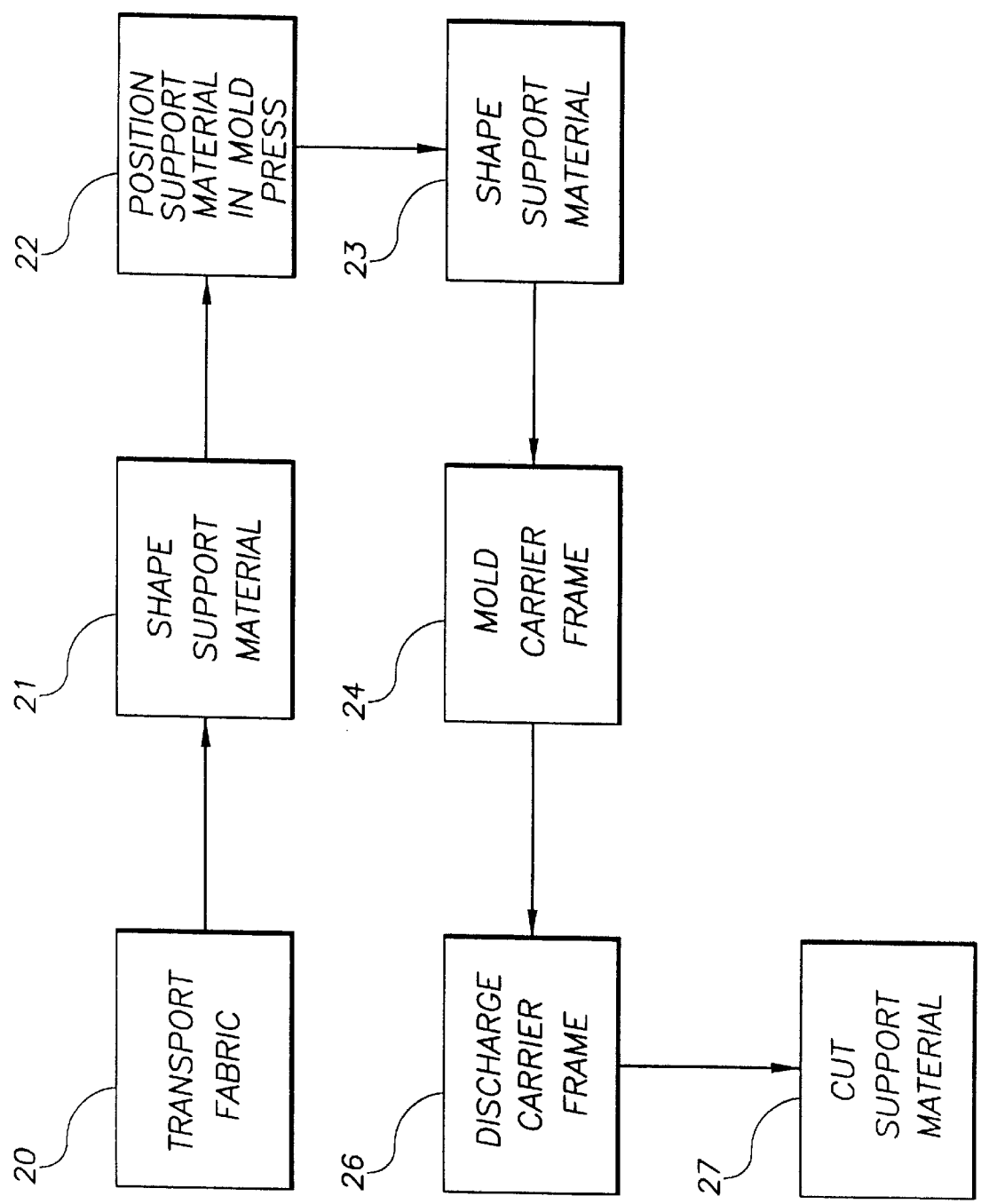
FIG. 3 is a process flow diagram for capturing support materials in carrier frames.

FIG. 3 is a flow diagram illustrating processes for capturing support materials in molded carrier frames comprising generally transporting, or moving, a support material to an openable mold press, illustrated in block 20, and positioning the support material therein when the mold press is open, illustrated in block 22, whereby the mold press forms a mold cavity for the carrier frame when the mold press is closed. The process also comprises generally molding the carrier frame after or while shaping the support material so that the shaped support material is captured by the carrier frame, illustrated in block 24, and discharging the carrier frame and support material captured thereby from the mold press after molding, illustrated in block 26.

In FIGS. 1 and 2, the system 100 comprises generally an openable mold press 110 having first and second plates 120 and 130 forming a mold cavity 112 into which a molten material is injectable to mold the carrier frame when the mold press is closed. FIG. 1 illustrates the mold press 110 in the closed configuration. At least one or both of the first and second plates 120 or 130 are generally movable relative to each other to permit insertion and positioning of the support material 40 therebetween when the mold press 110 is open. FIG. 1 illustrates, in phantom lines, the mold press 110 in the opened configuration, wherein the first mold plate 120 is moved away from the second mold plate 130 for this purpose. In other embodiments, however, the second plate 130 may be moved relative to the first mold plate 120 or both mold plates 120 and 130 may be movable toward and away from each other.

FIG. 2 illustrates the mold cavity 112 in the exemplary embodiment as a generally close-ended shape suitable for forming closed-ended carrier frames 30 disposed about and capturing a support material portion 42 therebetween, useable for example in the exemplary seat or seat back component application. More generally, however, the mold cavity 112 may have other shapes including open-ended configurations, for example a generally U-shape, for forming correspondingly shaped carrier frames used in these and other applications.

Generally, the support material is shaped before or during molding of the carrier frame. In one mode of operation, the support material is shaped as it moves toward the mold press, illustrated in block 21 prior to positioning therein. In an alternative mode of operation, the support material is shaped after positioning in the mold press, illustrated in block 23, either before or during molding of the carrier frame. And in yet another mode of operation, the support material is shaped both during transport to the mold press and after positioning in the mold press.

In one application, the support material is a stretchable elastic woven or non-woven fabric that is shaped by stretching in one or more dimensions as it is moved toward the mold press, or stretched in one or more dimensions after it is positioned in the mold press, or stretched partially as it moves toward the mold press then partially after it is positioned in the mold press, as discussed further below.

In other applications, the support material is a non-stretchable or non-elastic woven or non-woven fabric or some other non-fabric support material that may be shaped in the mold press and captured in the molded carrier frame, whereby the shaped support material substantially retains its shape upon its removal from the mold press. Generally, the support material may be shaped in the mold press either before or while molding the carrier frame. In one alternative application, for example, the support material is a cotton based material or some other material that is set thermally in the mold press after being shaped. The support material may be deformed upon closing the mold press, wherein thermal setting occurs any time before, during or after molding the carrier frame. In another alternative application, the support material is a plastic or composite material that is shaped by thermal deformation as the mold press closes.

In FIGS. 1 and 2, the support material 40 is supplied continuously to an input side 114 of the mold press 110 from a supply roll 48, which is particularly suitable for applications where the support material is a stretchable elastic fabric or some other fabric material. After the molding operation, excess support material 40 may be wound upon a take-up roll 49 located at an output side 116 of the mold press 110 upon separation of the carrier frame 30 and captured fabric portion 42 therefrom. The supply roll 48 may be driven by a drive member 52 associated therewith to reduce and/or control drag on the support material supplied therefrom. In applications where the support material 40 is a continuously supplied stretchable elastic fabric, drag on the supply roll 48 may be used to stretch the fabric or to control slack in non-elastic fabrics. The take-up roll 49 may also be driven by a drive member 50.

In an alternative mode of operation, the support material is supplied to the mold press 110 in discrete support material blanks 41, illustrates in phantom lines in FIG. 2. This alternative approach to supplying the support material to the mold press may be more suitable for applications where the support material is a relatively rigid material like plastic or possibly metal or a composite material. In some applications, however, the support material blanks may also be fabric blanks.

The support material is supplied generally to the input side 114 of the mold press 110 by a conveyor or by a robot. The conveyor also preferably conveys the support material and the molded carrier frame 30 away from the output side 116 of the mold press 110 after the carrier frame 30 and the support material portion 42 captured thereby are released and discharged from the mold press 110. In other applications, the conveyor preferably conveys a remaining portion of the support material away from the output side 116 of the mold press 110 upon separation of the carrier frame 30 and captured support material portion 42 therefrom.

In FIG. 2, first and second opposing conveyor rails 140 and 142 are located proximate the mold press 110 and configured cooperatively therewith for conveying the support material, either continuously or in discrete blanks, to the input side 114 thereof. The use of opposing first and second conveyor rails 140 and 142 is particularly desirable where the support material is a stretchable elastic material shaped by stretching as it is conveyed to the mold press 110, as discussed further below. For many applications, however, only a single conveyor rail 140 is required to convey the support material to the mold press. In these latter configurations having only a single conveyor rail, the continuous support member 40 or discrete support members 41 are suspended from only the first conveyor rail 140. The single conveyor rail configuration is particularly suitable for operations where the support material is relatively rigid, although it may be used in applications where fabric support materials are thermally set or stretched in the mold press, as discussed further below.

In the exemplary embodiment, the first and second opposing conveyor rails 140 and 142 are each circuitous, and each includes a corresponding plurality of clamping members 150 coupled together by linking members 148, shown sectionally in FIGS. 4a and 4b, to form a drive belt or chain, which is movable intermittently along the conveyor rails 140 and 142, for example by a common or corresponding rotary drive member 144, only one of which is shown. A toothed drive gear of the rotary drive member 144 may, for example, be engageable with complementary teeth formed on a back side of a drive chain, as is known generally, linking the clamping members 150. The conveyor rails 140 and 142 and clamping members 150 illustrated herein are only exemplary and may take other alternative forms, which are within the knowledge of those of ordinary skill in the art.

In one embodiment, the plurality of linked clamping members 150 on the opposing conveyor rails 140 and 142 are actuatable to clamp and retain corresponding opposing portions 44 and 46 of the support material as it is supplied thereto. FIGS. 4a and 4b illustrate more particularly each clamping member 150 having hinged arms 152 and 154 actuatable between opened and closed configurations depending upon the location of the clamping member 150 as it moves along the corresponding conveyor rail. The clamping members 150 are formed, for example, of a plastic material with a plastic hinge biased in the opened configuration. A groove in each conveyor rail defines corresponding flanges 146 and 147 that cooperate to retain the corresponding plurality of clamping members 150 therebetween as the corresponding drive chain moves the clamping members 150 along the conveyor rail.

The spacing between the flanges 146 and 147 of the conveyor rails 140 and 142 is dimensioned, or varied, widthwise along the rail to open and close the hinged arms of the clamping members 150 as the clamping members 150 move along the corresponding rails. FIG. 4a illustrates a clamping member 150 in the opened configuration as it approaches the support material 40 or 41, prior to engagement therewith. As the clamping member 150 moves further along the conveyor rail 140 to a position where the hinged arms 152 and 154 of the opened clamping member 150 are located on opposing sides of the support material, the spacing between the flanges 146 and 147 decreases to close the hinged arms 152 and 154 against the opening bias thereof, as illustrated in FIG. 4b. When the hinged arms 152 and 154 of the clamping member 150 are closed, the support material is engaged and retained therebetween, and thus conveyable to the mold press 110. To facilitate engagement of discrete support material blanks on the conveyor rails, the clamping members 150 may be modified for opening and closing manually. In other embodiments, the clamping members 150 may be replaced with other types of engagement or hooking members.

The discrete support material blanks preferably have alignment markings thereon to facilitate alignment thereof along the one or more conveyor rails 140 and 142. Initial alignment of any visible weave pattern between the conveyor rails 140 and 142 upon engagement of the support material 40 by the clamping members 150 will ensure proper alignment of any visible weave pattern in the mold press and with the molded carrier frame.

The conveyor rails 140 and 142, and more particularly the clamping members 150 thereof thus engage and transport the support material to the mold press 110 and position a portion of the support material between the first and second plates 120 and 130 thereof when the mold press 110 is open. Upon positioning a portion of the support material 40 in the mold press 110, further movement of the support material 40 along the first and second opposing conveyor rails 140 and 142 is interrupted until after any shaping or setting operations in the mold press and until after molding the carrier frame 30. Thereafter, operation of the conveyor or conveyors proceeds to remove the molded carrier frame 30 and captured support material portion 42 from the mold press 110, and to advance another support member toward and into the mold press 110 for the next shaping and molding operations.

FIGS. 1 and 2 illustrate generally the carrier frame 30 and support material portion 42 captured thereby discharged from the output side 116 of the mold press 110 after molding. In FIG. 2, the spacing of the rail slot between the flanges 146 and 147 is increased as illustrated in FIG. 4a after the support material 40 moves beyond the mold press 110 to some point where it is desirable to release the support material 40 from the first and second conveyor rails 140 and 142 after the molding operation, usually also after the carrier frame 30 and support material portion 42 captured thereby have been separated from the support material 40.

FIG. 1 illustrates the support material 40 being a stretchable elastic support material stretched in the mold press 110 before molding the carrier frame 30. According to this aspect of the invention, the stretchable elastic support material 40 is clamped in a loom formed integrally with the mold press 110 and stretched before molding the carrier frame 30. More particularly, the stretchable elastic support material 40 is clamped between upper and lower portions 160 and 162 of the loom as the mold press 110 closes. The upper loom portion 160 is coupled to the first mold plate 120 by springs or gas cylinders 164 which permit the first mold plate 120 to close fully after the stretchable elastic support material 40 is clamped between the upper and lower loom portions 160 and 162. Further closing of the mold press 110 stretches the stretchable elastic support material 40 disposed in and retained by the loom. The loom preferably has a close-ended configuration, whereby the stretchable elastic support material 40 is stretched in two dimensions, although the loom may be configured alternatively for stretching in only one dimension.

FIG. 2 illustrates a stretchable elastic support material 40 being stretched during transport to the mold press 110. The stretchable elastic support material 40 is stretched in a first dimension between the first and second opposing conveyor rails 140 and 142 as it moves to the mold press 110. More particularly, the first and second opposing conveyor rails 140 and 142 are curved to provide an increased spacing therebetween, which stretches the stretchable elastic material 40 coupled thereto as it moves toward the mold press 110, whereby the first and second opposing conveyor rails 140 and 142 are located to position the support material between the first and second plates 120 and 130 of the mold press 110 as discussed above. In embodiments where the support material 40 is not stretched as it moves toward the mold press 110, the conveyor rails 140 and 142 need not be curved to provide the increased spacing therebetween.

FIG. 2 also illustrates a stretchable elastic support material 40 being stretched in a second dimension along the first and second conveyor rails 140 and 142, generally transversely to the first dimension, as it moves along the first and second opposing conveyor rails 140 and 142 to the mold press 110. In one embodiment, a relatively constant drag is induced on the supply roll 48 by the drag member 52 coupled to the supply roll 48 as the stretchable elastic support material 40 is supplied therefrom. The stretchable elastic support material 40 is stretched preferably as it is supplied to the mold press 110 and also by the loom as the mold press 110 closes as discussed above in connection with FIG. 1. The stretchable elastic support material 40 however may be stretched only as it moves toward the mold press 110, or only by the loom after it is located and positioned in the mold press 110.

In the process flow diagram of FIG. 3, excess support material is removed from an outer side of the carrier frame generally after molding, as illustrated in block 27. FIG. 2 illustrates one mode of operation wherein an initial cutting operation is performed after the molded carrier frame 30 and support material portion 42 captured thereby are discharged from the mold press 110. The support material 40 is preferably retained by the conveyor during the cutting operation to stabilize the carrier frame 30 in applications where the carrier frame 30 is non-rigid. Thereafter, the remaining support material 43 is released from the clamping members 150 of the conveyor rails 140 and 142 for winding about the take-up roll 49, as discussed above, or other disposal. Thereafter, the carrier frame 30 may be trimmed more precisely in automated and/or manual trimming operations as is known.

Figure 5:
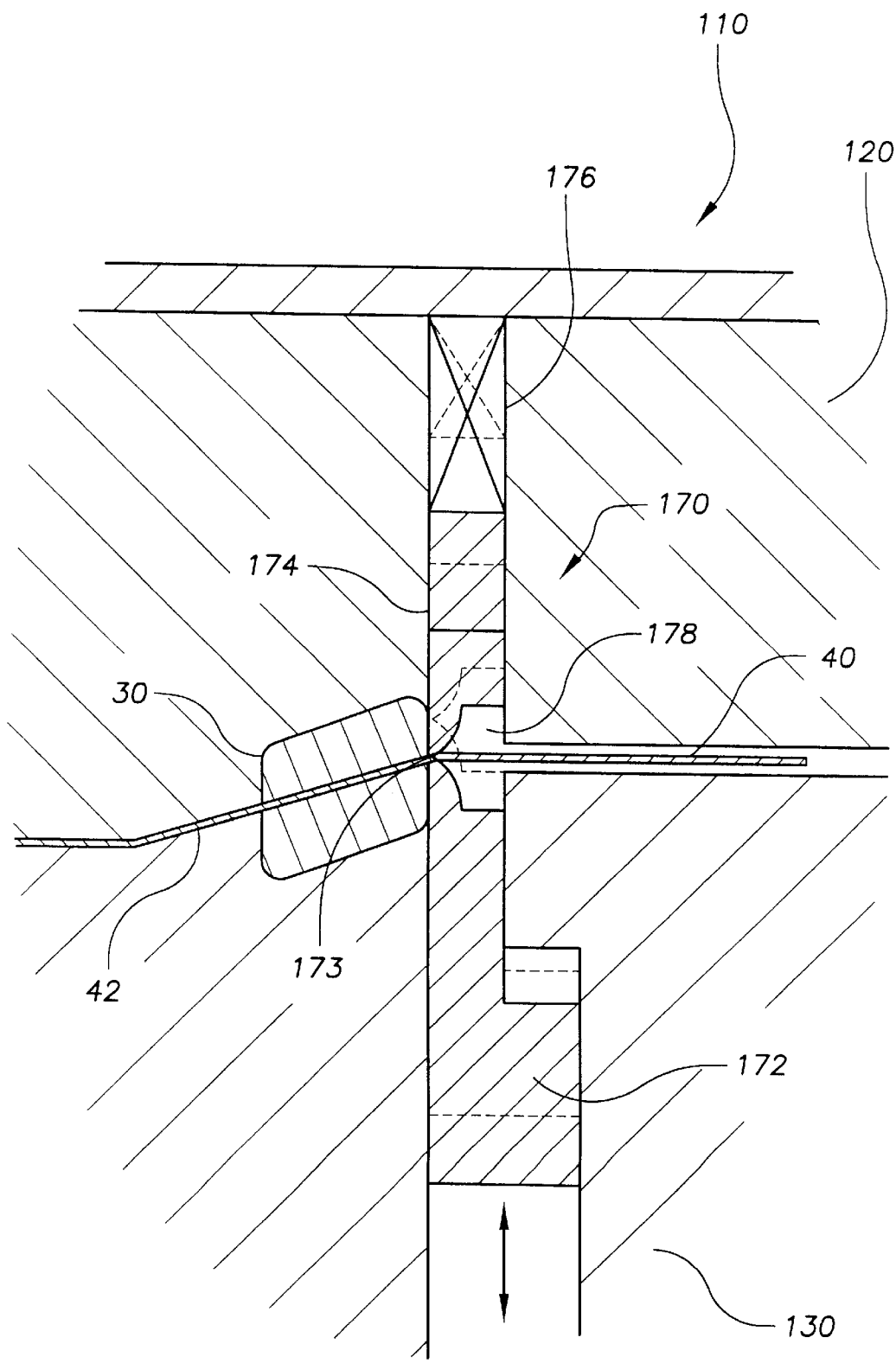
FIG. 5 is a partial detailed sectional view of a mold press according to an exemplary embodiment of the invention.
Figure 6:
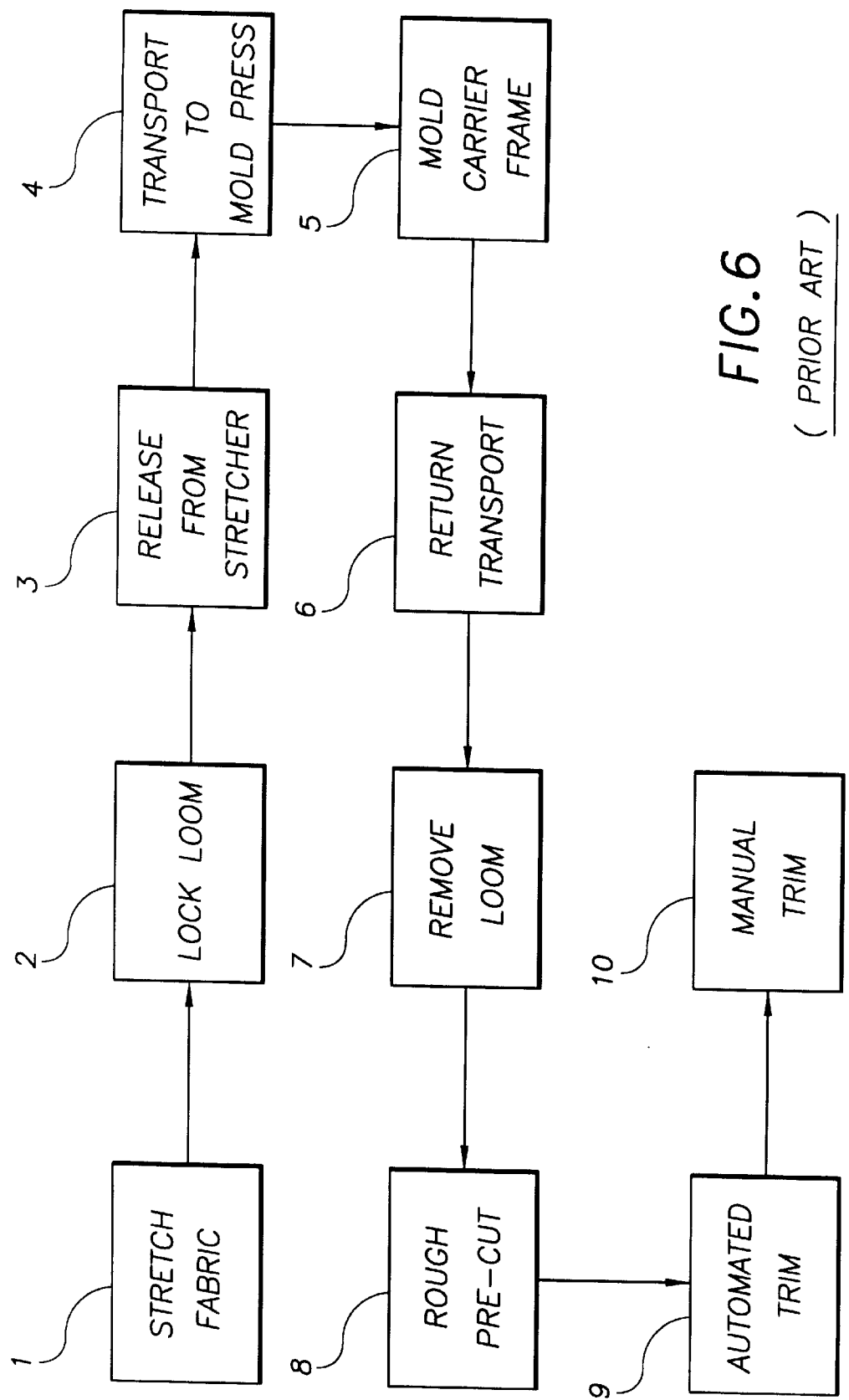
FIG. 6 is a prior art process flow diagram for capturing support materials in carrier frames.

According to an alternative mode of operation, excess support material is removed from an outer side portion of the carrier frame 30 after molding but before discharging the carrier frame 30 and the support material portion 42 captured thereby from the mold press 110. This mode of operation is particularly desirable where the support material is a fabric or some other readily severable material. FIG. 5 illustrates, more particularly, a separating, or cutting, member 170 for removing excess support material from the outer side portion of the carrier frame 30 before discharging, or ejecting, the carrier frame 30 from the mold press 110. The exemplary separating member 170 comprises generally a punch member 172 actuatably disposed in the second plate member 130 and movable in cooperation with an anvil 174 disposed in the first plate member 120 to remove the support material 40 from the outer side portion of the molded carrier frame 30. The punch member 172 has generally the same shape as the carrier frame 30 and is located concentrically thereabout so that a cutting edge portion 173 of the punch member 172 can relatively precisely sever any mold flash and the support material 40 located on the outer side portion of the carrier frame 30.

FIG. 5 illustrates the punch 172 and the anvil 174 forming a part of the mold cavity 12 that defines the carrier frame 30 and into which the molten material is injected during molding. In operation, after molding, the punch 172 is actuatable by pneumatic or hydraulic or other drive means, not shown but known in the art, toward the anvil 174, which has a similar complementary shape. FIG. 5 illustrates in phantom lines the punch 172 being actuated toward the recoiling anvil 174 during the cutting operation. The anvil 174 is mounted movably on springs or gas cylinders 176, only one of which is shown, thereby permitting the anvil 174 to recoil in response to actuation of the punch 172. As the punch 172 moves toward and displaces the anvil 174, the cutting edge 173 of the punch 172 severs any mold flash and the support material 40 from the outer portion of the carrier frame 30. A space or recess 178 is formed between the punch 172 and the anvil 174 to accommodate any mold flash protruding from the outer side portion of the carrier frame 30. After the cutting operation, the punch and anvil may be returned to the initial pre-molding positions. The punch 172 may also facilitate ejection of the molded carrier frame 30 from the mold cavity 112 upon opening the mold press 110. Performing the cutting operation in the mold press 110 eliminates the cutting and possibly the automated trimming operations of the prior art, thus streamlining production.

While the foregoing written description of the invention enables one of ordinary skill to make and use what is considered presently to be the best mode thereof, those of ordinary skill will understand and appreciate the existence of variations, combinations, and equivalents of the specific exemplary embodiments herein. The invention is therefore to be limited not by the exemplary embodiments herein, but by all embodiments within the scope and spirit of the appended claims.

What is claimed is:

1. A system for capturing a stretchable material in a carrier frame, useable in the manufacture of seat and seat back components, the system comprising:
    a stretchable material;
    an openable mold press having first and second plates forming a mold cavity for the carrier frame when the mold press is closed, the stretchable material positionable between the first and second plates when the mold press is open;
    a conveyor directed toward the mold press, the stretchable material coupleable to the conveyor to move the stretchable material to the mold press, the conveyor located to position the stretchable material between the first and second plates of the mold press,
    a material stretching member for stretching the stretchable material before molding the carrier frame,
    whereby the stretched material is capturable in the carrier frame after molding.

2. The system of claim 1 further comprising the material stretching member is first and second opposing conveyor rails having an increasing spacing therebetween to stretch the stretchable material coupled thereto as the stretchable material moves along the conveyor to the mold press.

3. The system of claim 1 further comprising the material stretching member is a clamp formed between the first and second plates of the mold press to clamp the stretchable material in the mold press, whereby the clamped stretchable material is stretched in the mold press before molding the carrier frame.

4. The system of claim 1 further comprising a cutting member disposed in the mold press, the cutting member actuatable to remove excess stretchable material from an outer side portion of the molded carrier frame.

5. The system of claim 1 further comprising the stretchable material is a continuous stretchable material coupleable to first and second opposing conveyor rails and movable thereby to the mold press, the first and second opposing conveyor rails located to supply the continuous stretchable material to an input side of the mold press.

6. The system of claim 5 further comprising the material stretching member is first and second opposing conveyor rails having an increasing spacing therebetween to stretch the continuous stretchable material therebetween as the stretchable material moves to the mold press, and a drag inducing member to stretch the continuous stretchable material along the first and second opposing conveyor rails as the stretchable material moves to the mold press.

7. The system of claim 1 further comprising the stretchable material is a discrete stretchable material blank coupleable to first and second opposing conveyor rails and movable thereby to the mold press.

8. A system for carriers frames having stretched materials captured therein, comprising:
    a stretchable material;
    a mold press having first and second mold plates with a carrier frame mold cavity therebetween;
    a conveyor having first and second rails,
    the stretchable material retained between the first and second rails of the conveyor,
    a portion of the stretchable material stretched between the first and second rails along at least a portion of the conveyor,
    the stretched portion of the stretchable material disposed between the first and second mold plates of the mold press.

9. The system of claim 8, the first and second rails directed toward an input side of the mold press and having corresponding portions disposed on opposite sides of the carrier frame mold cavity, the stretched portion of the stretchable material positioned across the carrier frame mold cavity.

10. The system of claim 8, a first spacing between first adjacent portions of the first and second rails less than a second spacing between second adjacent portions of the first and second rails.

11. The system of claim 10, the stretched portion of the stretchable material retained between the second adjacent portions of the first and second rails.

12. The system of claim 8, the stretchable material stretched along the conveyor, in a direction generally parallel to the first and second rails.

13. The system of claim 8, a stretchable material supply roll, stretchable material extending from the supply roll retained between the first and second rails of the conveyor, the stretchable material stretched between the supply roll and the mold press.

14. The system of claim 8, a clamping loom disposed about the carrier frame mold cavity, the stretched portion of the stretchable material disposed between the first and second mold plates clamped in the clamping loom.

15. The system of claim 8, a cutting device disposed about the carrier frame mold cavity.

16. A system for seat and seat back carrier frames having elastic fabrics captured therein, comprising:

an elastic fabric;

a carrier frame mold press having first and second mold plates forming a carrier frame mold cavity therebetween;

a conveyor having first and second spaced apart rails, the elastic fabric retained between the first and second rails of the conveyor, the elastic fabric stretched between a portion of the first and second rails, the stretched portion of the elastic fabric disposed between the first and second mold plates of the mold press, across the carrier frame mold cavity.

17. The system of claim 16, the first and second rails directed toward an input side of the mold press and having corresponding portions disposed on opposite sides of the carrier frame mold cavity.

18. The system of claim 16, a first portion of the conveyor having a first spacing between the first and second rails, a second portion of the conveyor having a second spacing between the first and second rails, the second spacing greater than the first spacing, the elastic fabric stretched between the first and second rails of the second portion of the conveyor.

19. The system of claim 18, the elastic fabric stretched along a length of the conveyor, in a direction generally parallel to the first and second rails.

20. The system of claim 19, an elastic fabric supply roll, elastic fabric extending from the supply roll retained between the first and second rails of the conveyor, the elastic fabric stretched between the supply roll and the mold press.

21. The system of claim 20, a clamping loom disposed about the carrier frame mold cavity, the stretched portion of the elastic fabric disposed between the first and second mold plates clamped in the clamping loom.

22. The system of claim 21, a cutting device disposed about the carrier frame mold cavity.

* * * * *